Dec. 8, 1953     T. HINDMARCH     2,661,628
POWER TRANSMISSION GEAR

Filed May 8, 1951     3 Sheets-Sheet 1

Inventor
T. Hindmarch

Dec. 8, 1953   T. HINDMARCH   2,661,628
POWER TRANSMISSION GEAR
Filed May 8, 1951   3 Sheets-Sheet 2
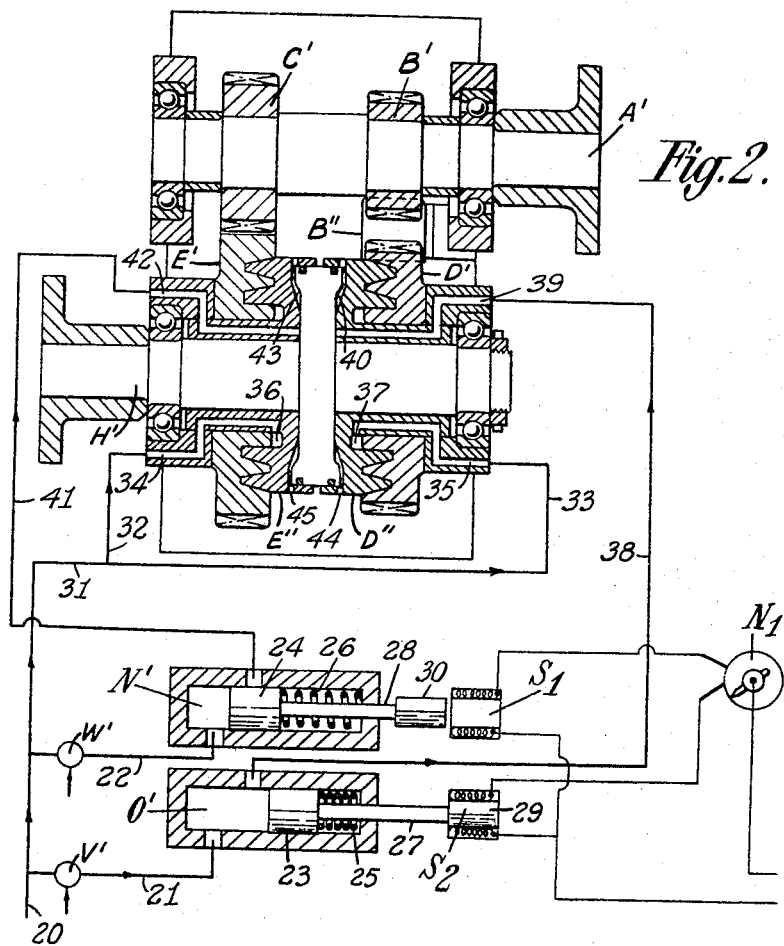
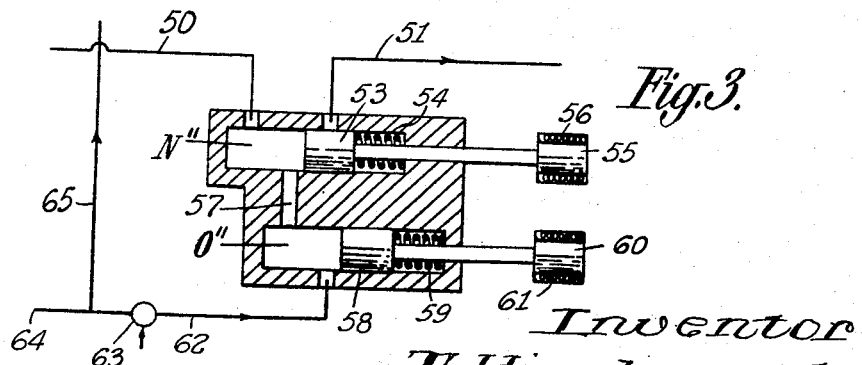
Inventor
T. Hindmarch Inventor
T. Hindmarch Patented Dec. 8, 1953

2,661,628

UNITED STATES PATENT OFFICE 2,661,628

POWER TRANSMISSION GEAR

Thomas Hindmarch, Chesham, England

Application May 8, 1951, Serial No. 225,247

14 Claims. (Cl. 74—364)

This invention relates to power transmission gears and has for its object to devise an improved form of gear which will be particularly suitable for use on spinning machines, although it will be understood that a gear in accordance with the invention is capable of general application.

It is well known that in spinning machines the diameter of the bobbins increases as the thread is wound upon them, and since normally the bobbins rotate at a constant number of revolutions, the speed of the thread increases and this leads to frequent thread breakages with consequent loss of time.

The present invention has as its main object to provide a power transmission mechanism which allows for speed changes on the driven shaft to take place, and these speed changes are such that either acceleration or deceleration from one speed to the other is smooth and without shock, and also the actual time period within which the change takes place can be regulated at will.

While this feature may be attained with an electrical or a hydraulic transmission mechanism, the present invention provides for an apparatus which may be called purely mechanical. It is furthermore very often desirable that such apparatus should be readily adaptable for quick and easy control, and while in some cases control is at the apparatus itself, in other cases the control may be at a remote point or the control may be carried out on the multiple principle, i. e. one control station may be on or nearby the apparatus whereas the other or others may be at remote points.

The invention consists of a power transmission gear of the kind in which the gear changes are effected by time shifts of clutches and is characterised in that the clutches are fluid-operated friction clutches and the period during which the power flow is transferred from one gear to another is regulated by controlling the rate of charge and/or discharge of fluid to the respective clutches.

The invention consists of a fluid pressure operated friction coupling system having at least two fluid pressure operated friction couplings each including fluid chambers controlling engagement and disengagement of the couplings. Means are incorporated in the system for providing a continuous flow of fluid under pressure through the chambers controlling disengagement so as to continuously exert pressure to actuate the couplings to a disengaged position. There is a fluid supply line for each coupling to the respective chambers controlling engagement of the couplings. Control valve means are provided for controlling the flow of fluid through each of these supply lines and valve operating means are provided to selectively control fluid flow through the supply line to the chambers controlling clutch engagement to permit either separate engagement and disengagement of the couplings or simultaneous actuation of the couplings as a pair or in pairs when more than two are involved, to disengaged position.

Power transmission mechanism according to the invention may take a number of different forms, such as, for instance, a unit which has one driving or input shaft coupled by any suitable means, be it flexible, solid, hydraulic or electrically to the prime mover, and one output or driven shaft which again may be coupled in any of the aforesaid ways to the plant or mechanism which is to be driven. Furthermore, either the input or the output shaft may run at a constant speed, in one and the same direction only, or either or both shafts may, if required, be arranged in such a way that a number of speeds can be obtained in any direction of rotation, this feature being entirely a matter of arrangement of the respective gears, pulleys or like devices together with the control mechanism which the power transmission mechanism of this invention may contain. A further form may also contain a plurality of input and one output shaft or vice versa, or both, the speed and direction of rotation of all these shafts being governed in the manner and by the governing apparatus to which I have referred above.

In the following I will now describe a number of applications of the power transmission in accordance with my invention, and in one of its simplest forms it takes the form of what may be called a two-speed gear box which is advantageously used in certain classes of textile machinery where it is desired to have the speed of a certain shaft or shafts varied and this variation must take place within a certain time period and it must be smooth either in acceleration or deceleration as otherwise, for instance, the threads of a spinning machine will break. My invention in one of its forms of application now overcomes this difficulty by providing between the prime mover which normally drives the machine at a constant speed and the driving shaft of the bobbins, a power transmission mechanism by means of which the speed of the said driving shaft can easily be changed so as to obtain the desired speed changes on the bobbins thus averaging out the actual speed and the tension of the thread which is wound onto the bobbin or bobbins.

The invention will be further described with reference to the accompanying drawings.

Figure 2 is a section of a transmission gear incorporating a reverse gear also showing diagrammatically the connections to an arrangement for controlling the supply of operating fluid.

Figure 3 shows an alternative arrangement of controlling the supply of operating fluid to the transmission gear of Figure 2.

Figure 1:
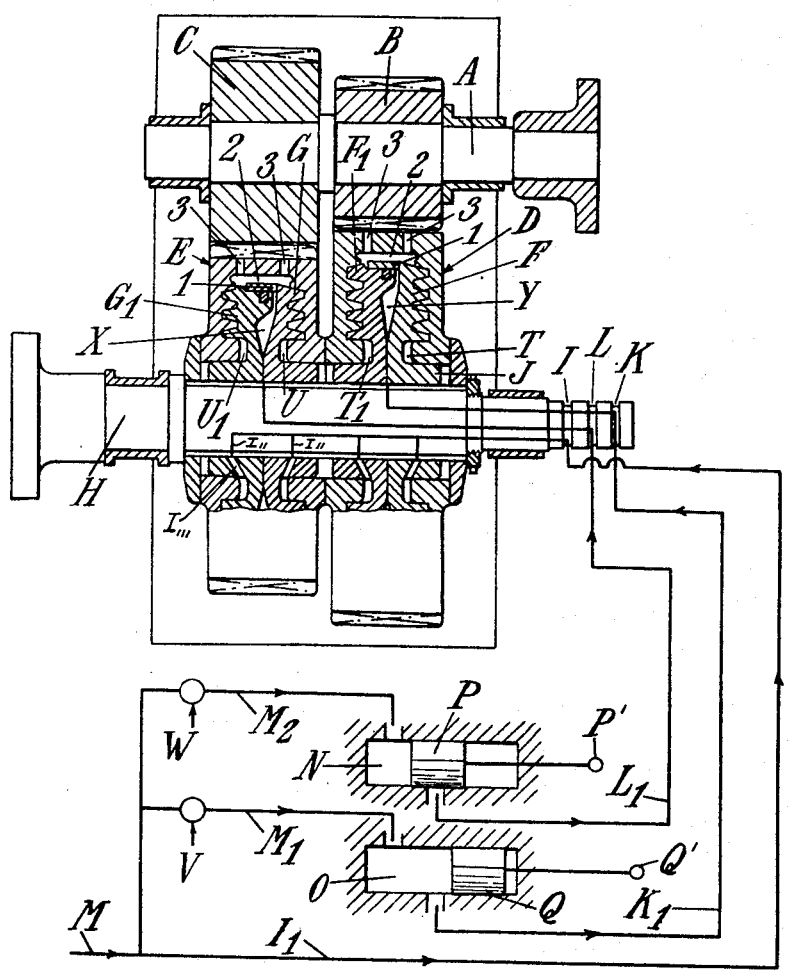
Figure 1 is a section of a transmission gear showing somewhat diagrammatically connections to an arrangement for controlling the supply of operating fluid.

In one convenient construction in accordance with the invention shown in Figure 1, I arrange on the driving or input shaft A coupled to the prime mover two gear pinions B and C which are of different diameters and which mesh directly with external gear members embodied with fluid operated friction clutches D and E. These clutches are of the type wherein the drive is taken up in a series of concentric V-grooves on the outer clutch members which engage in similar but mating V-grooves on the inner clutch members F, $F_1$ and G, $G_1$, respectively and which inner members are splined or similarly fastened to the output shaft H.

In the uncoupled position the outer members of the clutches rotate freely on bosses J, splined or otherwise fastened on the inner members, which are axially slidable so as to be free on and rotatable with the output or driven shaft H. If now I effect the necessary frictional contact between the V grooves of the outer member and inner members of one clutch by forcing the inner members apart to engage the outer member, the output shaft will rotate in the desired direction at the predetermined speed according to the ratio of gear teeth between the two respective gear wheels brought into operation by the clutch. For the engagement and disengagement of the inner clutch members, I can use any suitable fluid or gas, but I prefer to use a suitable lubricating oil. It can be seen that one convenient way of leading the oil which is under pressure to the clutch members for their operation is to provide axial and radial ducts, in the output shaft which carries the inner clutch members, and the supply of this oil under pressure enters shaft at three peripheral grooves I, L and K on the end of said shaft. It is understood that I can, of course, lead the pressure fluid to the respective chambers in any other convenient manner, be it by axial and/or radial ducts in bearing housings, bearings or by ducts within the inner and outer members of the clutches themselves. I can, of course, also lead pressure oil, from one to the other of the clutches or clutch members, and the way this is done entirely depends upon the application and the disposition of the various components of the power transmission mechanism.

To obtain a smooth engagement and/or disengagement of the clutch itself as and when changing from one speed to another I provide a control apparatus which directs and governs the supply of pressure fluid to and from the clutches and although I have so far described only a simple two-speed gear box it will be understood that the control can equally well be applied to a transmission having more than two speeds and more than two shafts, generally as hereinbefore referred to. Pressure is provided by a pump or any other suitable means, either integral with and driven from the gear itself or from an entirely separate unit, and means are provided to maintain the fluid pressure constant at a predetermined figure.

A main pressure fluid pipe M is provided wherein the desired oil pressure is created by the suitable means as aforementioned, as soon as or before the input shaft starts to rotate. Two suitable piston valves P and Q are movable in chambers N and O in order to either admit or to cut off the oil supply to the peripheral grooves L and K in the end of the output shaft, and the piston valves are of such a design that they have operating rods P' and Q' which will be suitably connected.

In the arrangement illustrated, the piston valves P and Q respectively control fluid flow to the inner clutch chambers X and Y so that when either of these valves are open fluid under pressure in the respective inner clutch chamber actuates the same to clutch engaged position and when either is closed the respective coupling or clutch controlled thereby is in disengaged position. In other words, when both of the valves P and Q are closed a neutral position is obtained and oil under pressure is admitted via the supply line $I_1$, only to the groove I on the output shaft which in turn is, through ducts $I_{11}$ and holes $I_{111}$, in constant communication with chambers U, $U_1$ and T, $T_1$, between the inner and outer members of the clutches thus keeping the projections in all the inner clutch members separated from the V-grooves of the outer clutch members so that the clutches are disengaged and the output shaft remains stationary. I now operate piston valve Q to the position illustrated to open the oil supply via supply line $K_1$ and groove K to a chamber Y between the inner members of clutch D, which chamber becomes filled with pressure fluid thus engaging the inner clutch members with the outer member of the clutch unit. However, in branch $M_1$ of the supply line M, I provide adjustable means V (shown diagrammatically) such as for instance a needle valve, by means of which I can regulate the speed with which the pressure in clutch chamber Y is built up, i. e. I can now control the time of engagement. Only when the clutch chamber is filled completely with fluid at the pressure which exists in the main pressure line is the clutch fully engaged and thus transmits to output shaft the required number of revolutions. If now a change of speed is to be made on the output shaft and this change must be made as even as possible without the output shaft being brought to rest, whether the output shaft is or is not under load, I proceed as follows:

The piston valve Q previously operated is returned into its original position by operation of its control rod Q' and simultaneously the other piston valve P is operated by its rod P'. The operation of rod Q' causes a gradual oil pressure drop in the chamber Y previously filled owing to the fact that I have provided the inner clutch member with a means of bleeding oil constantly and until the chamber is completely empty. The pressure oil in the chambers between the inner and outer members tends to force the inner clutch members together, but this movement can only take place as and when the total clutch engagement pressure in the first mentioned chamber has dropped to a certain value and the time until this value is reached entirely depends upon the size and shape of the bleeding means which I provide in the inner member. Such bleeding means may take the form of one or more radial holes 1, 2 and 3 opening into an outlet space whence the fluid can escape to the outside of the gears through further ducts or holes.

The operation of the rod P' will admit fluid from the supply line M over the adjustable means W, branch line M₂, valve chamber N, supply line L₁, groove L to the chamber X between the inner members G, G₁ of the clutch E in order to engage the clutch E.

It can now be seen that by effecting the movement of the control rods as described above, the necessary speed change will be effected in the pre-described manner, and while the clutch D operated by piston valve Q disengages slowly, the clutch E operated by the other piston valve P engages slowly, this taking up the drive of the output shaft. In the actual change-over period, clutch E will thus have a gradually decreasing slip between its outer and inner members, while the clutch D will have a gradually increasing slip, until the former is fully engaged and the latter is fully disengaged. The time period during which this change-over takes place is governed by the combination of oil supply regulated by the needle or like valves V, W above referred to and the bleeding means 1, 2 and 3 in the inner clutches. It is clear that bleeding means will be provided on any other clutch which may be incorporated in these power transmission mechanisms which are used to effect changes in speed or direction of rotation of the driven shaft.

It is obvious that the speed change is carried out in a similar way as above described if it is desired to change to the drive from any other clutch as may be required in a gear having more than two output shaft speeds and more than one direction of rotation on the driven shaft. It must also be understood that the piston valve or like control will equally apply to a gear having more than two clutches, and also the simple form of separate piston valve may be replaced by a piston valve having more than one supply and one delivery connection covered or uncovered by a common piston having various positions, and it must further be borne in mind that the single or multiple piston valve as aforementioned may also be replaced by any type or form of suitable rotary or slide valve which for a particular application of the gear may be found more convenient.

Figure 4:
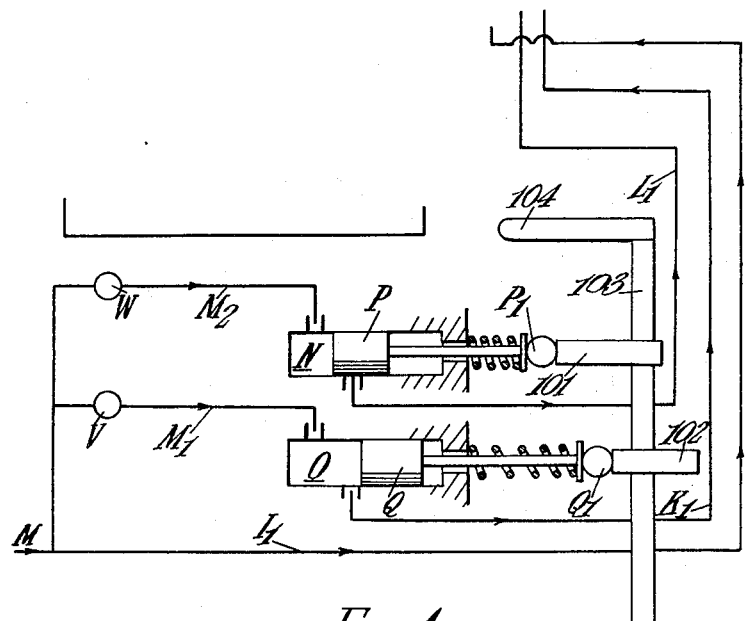
Figure 4 is a diagrammatic illustration of a manually operated mechanical arrangement for controlling the supply of fluid.
Figure 5:
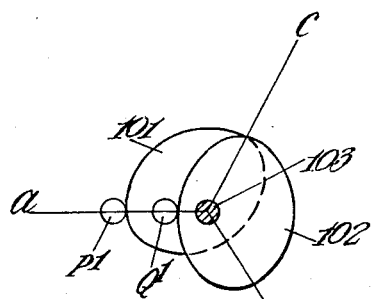
Figure 5 is a diagrammatic view of the portion of the valve control means embodied in Figure 4.

Figures 4 and 5 illustrate manually operated means for controlling the piston valves P and Q in the system embodied in Figure 1. The fluid under pressure flows from source through pipe M which is branched to provide conduits M₁ and M₂ controlled by the needle valves or other metering means V and W respectively, and to I₁ which communicates with the chambers of the coupling controlling disengagement thereof. The lines M₁ and M₂ respectively communicate with valve chambers O and N respectively controlled by the piston valves Q and P. Each of these piston valves is actuated by a cam arrangement. The piston valves are spring biased against the cams and include a cam follower portion on the end of the rods P' and Q'. A manually operable cam shaft carrying cams 101 and 102 is turned by handle 104. Cam 101 controls valve P and cam 102 controls valve Q. As shown in Figure 5, the cams can be turned to three positions, $a$, $b$ or $c$. In position $a$, corresponding to the showing in Figure 4, the cam 101 has moved valve P to closed position so that fluid does not flow through line L₁ and thus the coupling chamber controlled by valive P does not have pressure therein so that the coupling under this control is disengaged. Valve Q on the other hand, has been moved by the spring so that the fluid can flow through valve chamber O and through line K₁ the cam 102 being displaced on the shaft 103 relative to the position of cam 101, and the coupling chamber supplied by line K₁ is under pressure so that this coupling is engaged. In position $c$, both valves P and Q are closed and fluid under pressure flows through line I₁ to the chambers of both couplings that control disengagement so that both couplings are disengaged and the system is in neutral. Obviously, manipulation of the handle 104 effectively selects disengagement of the couplings controlled by the valves P and Q.

In connection with Figure 2 the invention is illustrated in a form embodying a reversing gear. In this form of the invention the input shaft A' which is coupled to the prime mover carries axially spaced gear pinions B' and C'. These pinions are of different diameters and pinion C' meshes directly with an external gear member embodied with a fluid operated friction clutch E'. In order to effect reversal of the drive the pinion B' meshes with an idler pinion B'' which in turn is in meshing engagement with an external gear member embodied with fluid operated friction clutch D'. Both of these clutches are of the type wherein drive is transmitted through frictional engagement of mating projections and recesses on inner and outer clutch members. The inner clutch members D'' and E'' are in splined relationship with respect to the output shaft H' and the projection carried by these inner clutch members cooperates with similarly formed grooves on the resepective outer clutch members of the clutches D' and E' which are rotatably mounted on bosses formed on the respective inner clutch members D'', E''. The relationship of the drive is such that when the clutch E' is engaged and the clutch D' is disengaged the drive is effected from shaft A' to shaft H' in one direction whereas when clutch E' is disengaged and clutch D' is engaged the drive relationship between shafts A' and H' is in the opposite direction.

Consistent with the invention the operation of the clutches, which as disclosed are the fluid operated type, is such that in order to provide a smooth engagement of the respective clutches, that the supply of fluid pressure to operate these clutches is controlled in such fashion that the period during which the power flow is transferred from one gear to the other is regulated by controlling the rate of fluid supply and/or discharge of fluid to the respective clutches in a manner similar to that disclosed in connection with the embodiment shown in Figure 1.

The pressure fluid for operating the clutches comes from a suitable source of supply through the line 20 which is provided with branches 21 and 22 leading to the control valve cylinders O' and N'. In each of the respective branches is provided a metering valve V', W' so that fluid under pressure and metered in accordance with the setting of the respective metering valves enters the intake core of the respective cylinders O', N' and passes through these cylinders under control of the valve heads of the piston type 23, 24 respectively. These valve heads are spring urged in one direction by the springs 25, 26 and the stems of these respective valves 27, 28 include armature members 29, 30 attractable by the solenoids $S_2$ and $S_1$ depending upon the particular position of the rotary press button switch $N_1$. In other words the current to the solenoids is alternatively actuatable to either retract the respective pistons 23, 24 under which condition fluid flows through the valve chambers O', N' or to permit the springs 25, 26 to move the pistons to such position at which fluid passage through the valve chambers is prevented.

With it understood that fluid under pressure flowing through line 20 can continue through line 31 which is branched at 32, 33 to enter bores 34, 35 to communicate with chambers 36, 37 and thereby force the inner members D'', E'' of the clutches axially of the shaft H' to clutch disengaged position in a manner such that no drive is transmitted between shafts A' and H'. Further in connection with this embodiment the manipulation of the switch $N_1$ can energize solenoid $S_2$ as illustrated so that fluid can flow through metering device V', conduit 21, valve chamber O', out through conduit 38 into bore 39 from thence it flows into inner chamber 40 to move inner clutch member D'' into clutching engagement whereby the clutch D' is engaged to effect a drive through the intermediary of idler pinion B'' in a reverse direction. In order to effect the drive in the opposite direction position of the valves 23, 24 is reversed so that upon de-energization of solenoid $S_2$ the energization of solenoid $S_1$ the movement of the valve heads or pistons 23, 24 is such that fluid will flow through metering device W', branch 22, valve chamber N', and conduit 41 through a suitable bore 42 to inner chamber 43 which will effect engagement of the inner member E'' with the outer member of clutch E'. Under these conditions the fluid under pressure can bleed through the openings 44, 45 in a manner similar to the bleeding of the oil in Figure 1 so as to regulate the time of engagement and disengagement of the respective clutch members.

In other words the embodiment of Figure 2, while illustrating a slightly different form of fluid clutch structure, differs from the embodiment of Figure 1 in that only a reverse drive is effected in addition to the change of speed due to the different sizes of the pinion gears B', C'.

Figure 3 illustrates a further embodiment in which alternative means of control for the engagement and disengagement of the clutches is employed in such fashion that the fluid pressure constantly tends to maintain the clutches in disengagement. In this modification the pressure lines 50, 51 can lead to either the clutch E' or D' of Figure 2 and these two pressure lines are on the outlet side of valve chamber N'' controlled by piston 53. This piston is urged to an outer position in the chamber by spring 54 and the rod of the piston includes an armature 55 of a solenoid 56 suitably energizable so as to either withdraw piston 53 to block fluid flow through line 51 or to permit the spring to move the piston so that fluid flow is blocked through line 50 and can pass through line 51, it being understood that these latter two lines communicate with the valve chamber N''. In fluid communication therewith by channel 57 is valve chamber O'', embodying piston valve or head 58 urged by a spring 59 and whose rod embodies an armature 60 controlled by solenoid 61. A fluid inlet conduit 62 is provided with a metering device 63 and is, as shown, a continuation of main supply conduit 64 which is branched at 65 to communicate similarly as in Figure 2 with branch conduits 32, 33 to admit fluid to the respective clutches to simultaneously move the inner members thereof to clutch disengaged position.

With the immediately aforedescribed arrangement disengagement of either of the forward or reverse clutches of Figure 2 is effected by the position of piston valve 58 which cuts off pressure fluid to the valve chamber N'' completely. In other words if solenoid 61 is de-energized and valve 58 moves to a closed position pressure fluid cannot flow through lines 50 or 51 to engage either of the clutches and the pressure fluid through lines 65 maintains the clutches disengaged. With the valve head 58 retracted fluid enters valve chamber N'' and is selectively issuable therefrom responsive to the position of valve head 53 through either line 50 or 51 to effect engagement of either the forward or reverse clutches. The bleeding means embodied with the clutch members operating similarly to the corresponding arrangement shown in Figure 1 to control the engagement and disengagement of the clutches in such fashion that responsive to movement of piston 53 one of the clutches engages slowly thus taking up the drive of the output shaft while the other clutch disengages slowly so that the first will have a gradually decreasing slip and the other will have a gradually corresponding slip until the first clutch is fully engaged and the second clutch is fully disengaged. The time period governing this changeover in gearing relationship is governed by the combination of the oil supply regulated by the metering valve means and the bleeding means in clutch members.

Having now fully described the invention what is desired to be secured by Letters Patent in the United States is:

1. A power transmission gear including in combination with input and output means, at least two gear trains incorporating units respectively associated with each said means incorporating chambers, fluid operated clutch means controlling the engagement and disengagement of each clutch and thus of each of said gear trains and said fluid operated clutch means including fluid supply means for the respective clutch means comprising means providing continuous flow of fluid under pressure to the chambers controlling clutch disengagement and means providing controlled fluid flow communication with the chambers controlling clutch engagement, fluid exhaust chambers for the clutch means, selectively operable control means embodied with said means providing controlled fluid flow communication with the chambers controlling clutch engagement to selectively control fluid supply to effect selective engagement of said clutch means in accordance with the desired drive relationship embodied with the respective gear trains and said fluid supply and exhaust means further including fluid flow metering means regulating fluid flow to said clutch chambers controlling clutch engagement and from said clutch chambers so that the transfer of power from one gear train to another is responsive to the time delay of fluid flow in such fashion that one clutch gradually disengages while the other clutch gradually engages until total disengagement of one clutch and driving engagement of the other clutch is effected.

2. A power transmission gear including in combination with input and output means and plural gear trains including elements embodied respectively with each said means, fluid operated clutch means operatively associated with each said gear trains and operable between engaged and disengaged position, said fluid operated clutch means including clutch engaging and disengaging chambers, fluid supply means for the clutch engaging chamber and selective control means therefor selectively governing engagement of each said clutch means, fluid supply means supplying fluid to the clutch disengaging chambers and thus normally urging all of said clutch means to disengaged position and fluid flow regulating means incorporated with said first mentioned supply means and said chambers to determine the period of transferring power between the elements of the respective trains so that the time period of engagement and disengagement of the respective clutch means is controlled by the rate of fluid flow.

3. A power transmission gear as defined in and by claim 1 in which the fluid exhaust means constitute bleeding means for constantly bleeding fluid supply from the clutch members at a predetermined rate and the selective control means constitute valve means operable to selectively admit and cut off fluid supply to said clutch chambers controlling clutch engagement, and means for moving said valve means so that when the fluid supply is cut off from the respective clutch means the operating pressure of one clutch will fall at a predetermined rate.

4. A power transmission gear as defined in and by claim 3 in which the operating means for the valves are manually operable.

5. A power transmission gear as defined in and by claim 1 in which the fluid exhaust means constitute bleeding means for constantly bleeding fluid supply from the chambers at a predetermined rate and the selective control means constitute valve means operable to admit and cut off fluid supply to said clutch chambers controlling engagement, and means for moving said valve means so that when the fluid supply is cut off from the respective clutch means the operating pressure of one clutch will fall at a predetermined rate, and said valves constituting piston valves and said operating means for said valves constituting solenoids and switch means controlling the same.

6. A power transmission gear as defined in and by claim 1 in which said clutch means constitute friction clutches including inner and outer members one of which is axially movable and both said members having mating V grooves and projections.

7. A power transmission gear as defined in and by claim 1 in which one of said gear trains incorporates reversing means so that the output means is rotatable in opposite directions depending upon which clutch means is actuated.

8. A power transmission gear as defined in and by claim 1 in which the selective control means includes two valve means, conduit means interconnecting the valve means, said fluid supply means including a conduit leading to one of said valve means so that fluid flow is controlled thereby, and said fluid supply means further including separate conduits for energizing the respective clutch means communicating between the respective clutch means and the other of said valve means, and means for operating both said valve means whereby said first valve means controls fluid flow to said second valve means so as in one position to prevent energization of any clutches and said second valve means being movable between positions selectively controlling energization of the respective clutches when said first valve means is in position to permit fluid flow to said second valve means.

9. In a fluid pressure operated friction coupling system the combination of means defining at least two fluid pressure operated friction couplings, each coupling including fluid chambers controlling engagement and disengagement respectively, means providing a continuous flow of fluid under pressure through the chambers controlling disengagement so as to continuously exert pressure to actuate the couplings to disengaged position, each coupling including a fluid supply line for the chambers controlling engagement, control valve means controlling the flow through each supply line, and means for operating the valves so as to selectively control fluid flow through the supply line to each chamber controlling engagement to permit either separate engagement and disengagement of the couplings or simultaneous actuation of the coupling as a pair to disengaged position.

10. Coupling system as claimed in claim 9 in which a fluid pressure control means is provided in the supply line to the chamber controlling engagement of each coupling.

11. Coupling system as claimed in claim 9 in which the means operating the valves is a mechanical interconnection between valves.

12. Coupling system as claimed in claim 9 in which the valves have a common movable member in a chamber having a single inlet and a plurality of outlets.

13. Coupling system as claimed in claim 9 in which a position is provided for the valves in which all the couplings become disengaged.

14. In a fluid pressure operated coupling system as claimed in claim 9, and the means for operating the valves comprising electro-magnetic means and switch means for controlling the electro-magnetic means.

THOMAS HINDMARCH.

References Cited in the file of this patent

UNITED STATES PATENTS

| Number | Name | Date |
|---|---|---|
| 1,979,488 | Perez | Nov. 6, 1934 |
| 2,080,067 | Stucatur | May 11, 1937 |
| 2,120,104 | Livermore | June 7, 1938 |
| 2,133,548 | Lassiter | Oct. 18, 1938 |
| 2,161,702 | Durig | June 6, 1939 |
| 2,320,960 | Wheaton | June 1, 1943 |
| 2,352,478 | Halford | June 27, 1944 |
| 2,419,906 | Mills | Apr. 29, 1947 |
| 2,488,540 | Hollingsworth | Nov. 22, 1949 |
| 2,511,039 | Black et al. | June 13, 1950 |
| 2,518,781 | Hindmarch | Aug. 15, 1950 |